Sept. 6, 1932.  K. K. A. THORSEN  1,876,100
TIRE VULCANIZING MACHINE
Filed Aug. 12, 1929  2 Sheets-Sheet 1
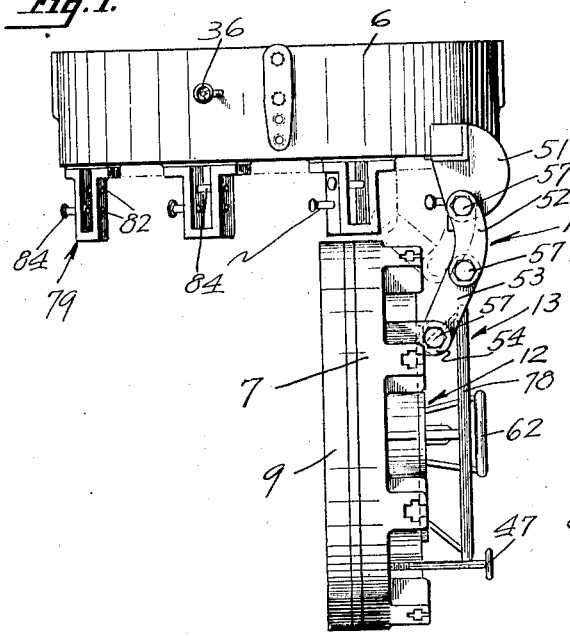
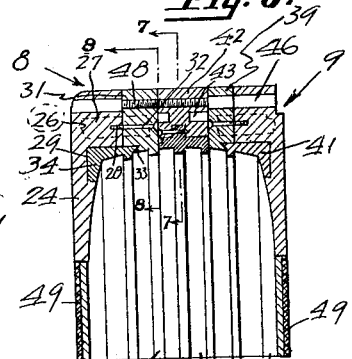
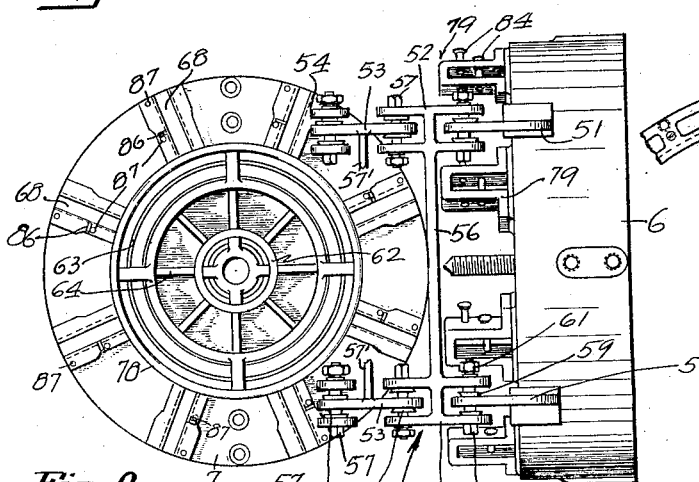
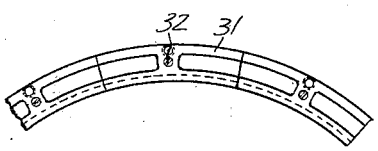
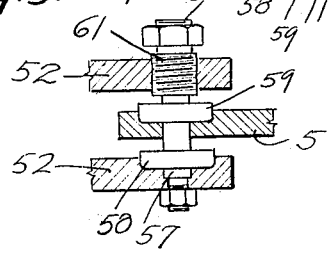
INVENTOR.
KARL K.A. THORSEN
BY Lincoln Johnson
ATTORNEYS.

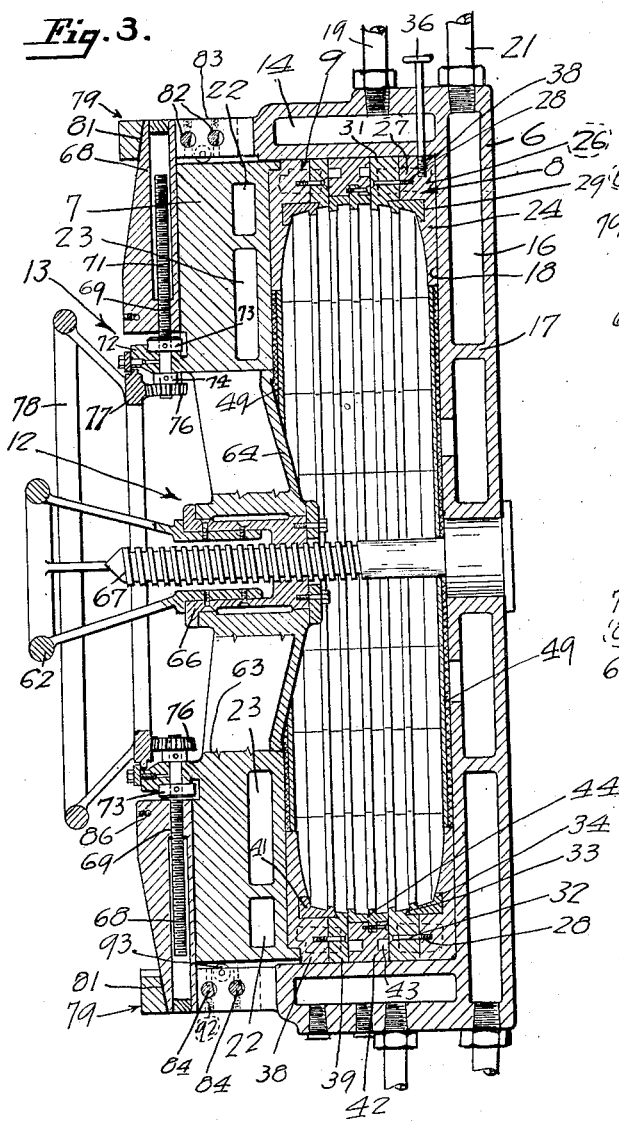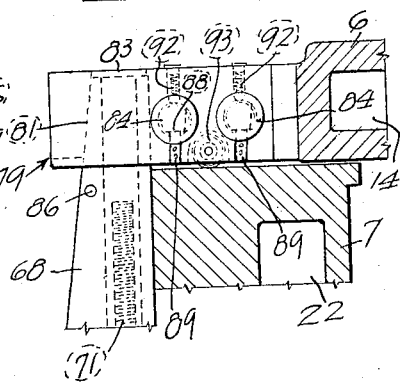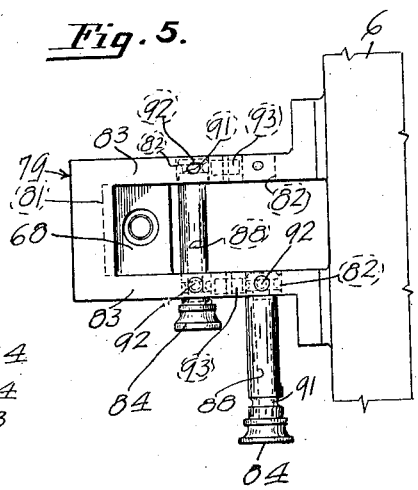

Patented Sept. 6, 1932

1,876,100

UNITED STATES PATENT OFFICE

KARL K. A. THORSEN, OF SAN FRANCISCO, CALIFORNIA

TIRE VULCANIZING MACHINE

Application filed August 12, 1929. Serial No. 385,248.

This invention relates to tire vulcanizing machines. The primary object of the invention is the provision of a tire vulcanizing machine, adapted to be used for the original curing of tire casings or for curing retreads on old casings, the machine being interchangeable for either of said purposes; the matrix in said machine being made in complemental sections, one set of said sections being mounted in a stationary mold block of the machine, the others upon a movable mold section of the machine, so as together form a complete mold matrix when the movable mold section is secured unto the stationary mold block; the former being adapted to extend into the recess of the latter.

Another object of the invention is to provide a tire vulcanizing machine of the character described, which includes a novel and efficient means for fastening the mold sections in operative position; said fastening means being adjustable to effect the securing of the mold sections to each other when used in connection with matrices of different thickness and size, the movable portion of the mold extending at all adjustments into the stationary mold member, whereby the machine is perfectly sealed, and insulated from the atmosphere.

Another object of the invention is the provision of a vulcanizing machine of the character described which includes novel and efficient means to hingedly and bodily movably attach the movable mold section to the stationary mold member; the attachment being adjustable to allow the accurate alignment of the mold sections relatively to each other.

Another object of the invention is the provision of a vulcanizing machine of the character described in which the matrices and dies are made of sections so assembled as to allow the construction thereof with substantially even wall thickness throughout their entire circumference; means being provided to hold one set of matrix sections in place in the stationary mold member, and to hold the other matrix sections upon the movable mold section; the securing means of the movable matrix sections being adapted to be brought into engagement with the stationary matrix sections for withdrawing the same from the mold, at will.

Other objects of the invention are to provide a device of the character described that will be superior in point of simplicity, inexpensiveness of construction, positiveness of operation, and facility and convenience in use and general efficiency.

In this specification, and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

The invention is clearly illustrated in the accompanying drawings wherein:

Fig. 1 is a plan view of the vulcanizing machine constructed in accordance with my invention, showing the mold in open position;

Fig. 2 is a side view of the vulcanizing machine, in the open position;

Fig. 3 is a fragmentary sectional view of the machine, when closed;

Fig. 4 is a detail view partly in section of the mold fastening mechanism of the machine;

Fig. 5 is a plan view of the mold fastening mechanism.

Fig. 6 is a sectional detail view of the matrices and dies of the machine, the section being taken on the line 5—6 of Figure 7;

Fig. 7 is a sectional view of the matrices and dies, the section being taken on the line 7—7 of Figure 6, Fig. 8 is a fragmental front view of the stationary matrix and die viewing the same in the direction of arrows 8—8 in Figure 6, and Fig. 9 is a sectional detail view of one of the hinge joints.

In its general organization the vulcanizing machine, herein illustrated, includes a mold block, upon which is bodily movably and swingably mounted, a mold section 7. A stationary matrix 8 is contained in the mold block 6, and a complemental matrix 9 is fastened on the mold section 7, which matrices include an annular space within which the tire is treated.

The mold section 7 is connected to the mold block 6 by means of the hinge 11, and it is moved into operative position in the said mold block 6 by the action of the mold closing mechanism 12. After the mold section 7 is in operative position it is securely held in place by a fastening mechanism 13.

In order to cure the tire the mold block 6 and the mold section 7 must be heated. When the machine is used for retreading a tire, then it is only necessary to heat the mold around the periphery thereof, however when a new tire is treated then it is necessary to convey heat also to the side of the mold. The machine is rendered interchangeable for both operations by providing for independent heating of the peripheral portions and the sides of the mold. The portion of the mold block 7 surrounding the circular mold space has an annular heating jacket 14 therein, and a similar jacket 16 is formed in the end wall 17 of the block 6. It is to be noted that within the said block 6 is formed a recess 18 which is surrounded by said heating jackets 14 and 16. The heating jackets 14 and 16 are filled with a suitable heating medium, such as steam, through conduits 19 and 21 respectively, the latter being controlled by suitable valves, in such a manner that the heating medium may be conveyed in either one of said heating jackets separately or in both jackets at the same time. Similar heating arrangement is provided on the mold section 7, through a peripheral jacket 22 and a side wall jacket 23.

Within the recess 18 is secured the matrix 8, which is of a sectional structure. An annular matrix section 24 is disposed adjacent the end wall or bottom of the recess 18. The matrix section 24 is cored as at 26, and has ribs 27 in said core 26, in which latter are provided threaded holes 28. The annular section 24 also has an annular groove 29 therein. On the face of the matrix section 24 are mounted arcuate segments 31, by means of screws 32, which latter engage the respective holes 28. The segments 31 are also cored, whereby even heat transmission, and expansion is effected throughout the matrix. The segments 31 complement each other to form a complete circular matrix section. The segments 31 are provided with dovetail recesses 33, complementing the annular groove 29. In said groove 29 and recesses 33 are securely held the segmental dies 34, corresponding to the desired design of the tire tread. The inner periphery of the segments 31 also conform in shape to the desired tire tread design. The entire matrix 8 is normally removable from the mold block 6, but in operation it is held against removal by set screws 36 extending radially through the mold block 6, so as to be manipulated from the outside. These set screws 36 engage threaded holes 37 in the matrix 8. Before the matrix 8 can be removed from the mold block 6 the set screws 36 must be withdrawn therefrom.

The matrix 9 in the movable mold section 7 is constructed from an annular, cored matrix section 38, upon which are mounted matrix segments 39, similarly to those of the matrix 8. The section 38 is grooved, and the segments 39 are dovetail recessed to receive and hold segmental dies 4, when assembled. On the face of the segments 39 are disposed central matrix segments 42, cored as at 43, and provided on the inner peripheries thereof with segmental, complemental dies 44, conforming with the tire tread design. Through the central segments 42 and the segments 39 and annular section 38 are holes 46, in registry with each other. The holes 46 in the central segments 42 are threaded. Into these holes 46 extend set screws 47, engaging the threaded holes in the central segments 42. The set screws 47 are also in threaded engagement with the wall of the mold section 7, whereby the central segments 42 are fastened to the matrix 9 as well as the matrix 9 itself is firmly attached to the mold section 7.

It is to be noted here that the segments 31 also have threaded holes 48 therein, in registry with holes 46. The purpose of the holes 48 is to allow the removal of the inner matrix 8, by threading the screws 47 into the holes 48, and then by moving the mold section 7 out of the mold block 6, whereby the entire matrices 8 and 9 are withdrawn from the block 6. Of course before such removal can be effected, it is necessary also to unscrew the set screws 36 from the matrix 8.

The inner peripheries of the matrices 8 and 9 and dies 41 and 44 form the design in which the tire tread is molded. The heat is transferred from the mold block 6 and mold section 7 to the said matrices and dies and is evenly distributed therethrough whereby the proper, even curing of the tire is effected.

In the event the machine is used for retreading, the side of the tire is not cured, and to prevent the transmission of heat thereto, the sides are insulated by insulating discs 49, one on the mold block 6, and another on the mold section 7 at the inner peripheries of the matrix sections 24 and 38. On the other hand, if the machine is used to treat new tires, then the insulating discs 49 are removed, and proper side matrices and dies are substituted therefor.

The dies and the matrices are readily removable and new dies or matrices of a different design may be secured into the mold. Additional matrix sections may be added, by securing the same on the face of the central segments 42, which is accomplished by the threading of the set screws 47 through the segments 42 and into corresponding holes of the additional matrix sections.

As illustrated in Figure 3 the recess 18 is sufficiently deep to provide for matrices of different thickness, and to allow the extension of the mold section 7 into said recess regardless of the thickness of the matrix used, within the limit of a machine. The insertion of a comparatively large portion of the mold section 7 into the recess 18 prevents the entering of fresh air to the matrices, thus allowing the even heat distribution throughout all the matrix sections and the even curing of the entire tire tread.

The hinge connection 11 by which the mold section 7 is supported on the mold block 6, permits the movement of the mold section 7 axially to the mold block 6, and then the pivotal swinging of the mold section 7 into an out of way position, to allow free access into the recess. The hinge 11 is supported on ears 51 which extend from one side of the mold block 6, in vertical alignment with each other. Into each ear 51 is pivoted a double yoke link 52. One end yoke of each link straddles an ear 51, into the other end yoke of each link is pivotally secured a hinge link 53, the end of which in turn is pivoted between lugs 54 on the movable mold section 7. The two sets of lugs 54 are also in vertical alignment with each other. The upper and lower yoke links 52 are rigidly connected to each other by a bar 56; and the upper and lower hinge links 53 are similarly connected to each other by another bar 57', whereby the upper and lower halves of the mold section 7 are moved uniformly and simultaneously without relative sagging or tilting.

The pivotal connections of this hinge 11 are constructed so as to permit adjustment of the position of its elements relatively to each other, thereby to center accurately the mold section 6 relatively to the mold block 6. Each pivotal connection comprises a bolt 57, extending thru registering holes in the hinge elements. On the bolt 57 is a thrust bearing 58, to prevent axial movement of the bolt 57. A ball bearing 59 is provided on said bolt 57, against which the pivoted element bears, whereby the frictional resistance against the rotation movement of the respective elements is reduced. Adjacent each ball bearing 59 is an adjusting nut 61 threaded in the respective supported elements such as the upper lugs 54 or a branch of the yoke link 52. The nut 61 may be locked by the insertion of a cross pin 62, through the end of the bolt 57, and the nut 61. It is to be noted that the adjusting nuts 61 are on the top of the lugs 53 and above the ears 51, but are on the bottom of the intermediate point because the weight of the mold section 7 bears downwardly on the top of the link 53, and the yoke link 52 also presses downwardly on the top of the ears 51, but the inner end of the link 53 exerts a pressure on the lower branch of the respective yoke of the yoke link 52. By unscrewing the adjusting nut 61 in the outer end of the link 53, the upper lug 54 is brought closer to the link, thus lowering slightly the mold section 7. Similarly in the other pivotal joints the respective hinge elements may be raised or lowered relatively to each other, by the tightening or loosening of the adjusting nuts 61. In this manner the mold section 7 can be accurately centered relatively to the mold block 6.

In operation the mold section 7 is moved bodily parallel with the axis of the mold block 6, while it is near to said block 6. During this straight line movement the yoke links 52 swing around their pivot. After the mold section 7 clears the block 6, then it is swung into an out of way position, around the respective pivots of the hinge links 53, the links themselves also swinging outwardly, render the operation smooth and light.

After the matrix is assembled, and the tire is in place within the mold block 6, then the mold section 7 is swung around the hinge 11 to a position in alignment with the recess 18 of the block 6. At this time the centrally disposed closing device 12 is brought into action for advancing the mold section 7 into the recess 18. The closing device 12 is similar to the structure described in my copending application for tire vulcanizing machines, Serial Number 315,628, filed October 29, 1928. A hand-wheel 62 is in a central opening 63 of the mold section 7, rotatably supported, against axial movement relatively to the mold section 7, in a spider 64; the latter being mounted in the opening 63. A flanged screw threaded collar 66 is fixedly secured centrally to the wheel 62. A threaded rod 67 is fixedly secured in the center of the block 6 and extends axially therefrom projecting beyond the recess 18, and through the spider 64, when in operative position. When the mold section or door 7 is moved bodily toward the recess 18 the threads of the collar 66 are brought in registry with the end of the threaded rod 67, whereupon the mold section or door 7 is bodily advanced into the recess 18, by the rotation of the handwheel 62 and the collar 66 therewith. Thus the mold section 7 is positively advanced axially into and out of said block 6. By the rotation of the handwheel 62 the matrix section 9 is firmly pressed against the stationary matrix section 8. Inasmuch as the mold door or section 7 extends into the recess 18, the entire matrix is effectively sealed from outside cooling action. The length of the threaded rod 67 is such as to allow the effective closing of the mold, in connection with matrices of various thickness.

After the mold section 7 is in operative position, it is firmly fastened in place, by the action of the fastening mechanism 13. This mechanism comprises primarily, a plurality of wedges 68 slidably held on the outer face of the mold or door 7, so as to be movable radially. Each wedge 68 has a threaded hole 69 therein, for receiving a screw 71. The screws 71 are rotatably supported adjacent the inner ends thereof in brackets 72 on the mold section 7, and are prevented from radial movement relatively to said brackets 72, by collars 73 fixed to said screws 71, at one side of the respective brackets, and by the hubs 74 of gears 76, fixedly secured to the ends of the screws 71, on the other side of the brackets 72. On the inside periphery of the brackets 72 is rotatably mounted a ring gear 77, which gear 77 is in mesh with the gears 76. A handring or wheel 78 is fixed to and provides for the rotation of the ring gear 77. By rotating the ring gear 77 in one direction, the screws 71 are so rotated as to cause the radial advancement of the wedges 68 outwardly, beyond the periphery of the mold section 7. The wedges 68 are received in retainers 79 fixed on the face of the mold block 6. By forcing the wedges 68 into said retainers 79 the mold section is securely and tightly pressed and held in operative position.

Inasmuch as the machine is adapted to be used in connection with matrices of different thickness, provision is made for rendering the fastening mechanism adjustable. This provision resides in the construction of the wedge retainers 79 to permit the wedging action at a plurality of points spaced from the block 6. In this illustration three such steps are provided. Due to the elongated taper of the wedge, this of course, provides for adjustment to any thickness within the range of the retainers.

Each retainer 79 is of a substantially U shaped loop, the end wall of which is tapered as at 81, so as to conform to the taper of the wedge 79. Two holes 82 are provided in each leg 83 of the retainer 79. The respective holes 82 in the opposite legs 83 are in registry with each other. Through each set of registering holes 82 slidably extends a pin 84. When the innermost pin 84 is inserted through the retainer 79 then the wedging action and fastening can be efficiently achieved, in connection with the smallest matrices. When the matrix used is so thick, that the outer face of the mold section 7 projects beyond the plane of the innermost pin 84, then the innermost pin 84 is withdrawn from between the retainer legs 83 and the next pin 84 is inserted. When the thickness of the matrix used exceeds the limit of the wedging action at the pins 84, then both pins are withdrawn, and the wedge 68 coacts with the tapered end 81 of the retainer 79. The fastening mechanism is thus rendered adjustable.

In order to prevent the jamming of the wedge 68 at the ends of its stroke, I provide a stop pin 86 extending from the side of each wedge 68, which abuts against stops 87 at the ends of its respective strokes. The stops 87 are fixedly secured in the outer wall of the mold section 7.

The pins 84 are so held in said retainer 79 as to prevent the accidental withdrawal or removal thereof from said retainer. Each pin 84 has a longitudinal slot 88 on one side thereof, the ends of which slot 88, abut against a stop plate 89 protruding in the end of each hole 82. Each pin 84 also has an annular groove 91 adjacent each end thereof, into which grooves 91 snap spring pressed catches 92, the latter being suitably secured within the legs of the retainer 79, so arranged, that both catches 92 are in engagement with the respective grooves 91, when the pin 84 is inserted in operative position.

It will be recognized that a particularly efficient tire vulcanizing machine is provided, in which the matrix is positively sealed from the atmosphere, thus the heat is evenly distributed throughout the same; the matrix is interchangeable; the elements of the machine are readily placed in operative position by accurately adjustable devices; the sealing and fastening elements, as well as the door or mold closing mechanism, are adapted to operate efficiently in connection with matrices of various thickness; the machine does not require any complicated adjustment, it combines ruggedness of construction with positiveness of operation, and ease and facility of adjustment, therefore it readily lends itself to application by the labor ordinarily available.

The closing and opening of the mold section 7 is rendered more accurate, and is further facilitated by the provision of roller ball bearings 93 in each leg 83 of each retainer 79. The roller bearings 93 are disposed between the holes 82 so as to protrude slightly beyond the inner surface of the retainer, as clearly shown in Figure 4. When the mold section 7 is moved bodily on the threaded rod 67, then the outer periphery of the section 7 rides on, and is guided by said rollers.

Having thus described this invention what I claim and desire to secure by Letters Patent is:

1. A tire vulcanizing machine comprising a body member having a tire receiving recess therein and having a heating chamber in the peripheral wall thereof, and a heating chamber in the end wall of said recess adjacent its periphery, divided into two heating chambers, one nearer to the outer periphery, the other nearer to the center of the end wall, said heating chambers acting independently of each other; and a movable mold section bodily movably connected with said body member, and arranged to extend into said tire receiving recess; said movable mold section having separate heating chambers in the end wall thereof adjacent its outer periphery, and adjacent its inner periphery to be rendered selectively operative.

2. A tire vulcanizing machine comprising a body member having a tire receiving recess therein, and having a heating chamber in the wall of said recess; a movable mold section arranged to extend into said tire receiving recess; and means for bodily movably and hingedly supporting said mold section on the body member; said supporting means comprising a hinge link pivotally mounted on the body member; and a hinge element on the mold section pivotally attached to said link, the pivots of said link and hinge element being adjustable to center the movable mold section relatively to the body member.

3. A tire vulcanizing machine comprising a body member having a tire receiving recess therein, and having a heating chamber in the wall of said recess; a movable mold section arranged to extend into said tire receiving recess; means for bodily movably supporting said mold section on the body member, and adjustable means for fastening the mold section in operative position; said fastening means comprising fastening blocks slidably disposed on said section; fixed retainer elements on the body member into which said blocks fit; and adjustable means in said elements to allow the insertion of said blocks therein, in different operative positions of the mold section at a predetermined distance from said recess; and means to move said blocks simultaneously into and out of engagement with said adjustable means.

4. A tire vulcanizing machine comprising a body member having a tire receiving recess therein, and having a heating chamber in the wall of said recess; a movable mold section arranged to extend into said tire receiving recess; means for bodily movably supporting said mold section on the body member; adjustable means for fastening the mold section in operative position; said fastening means comprising fastening blocks slidably disposed on said section; fixed retainer elements on the body member into which said blocks fit; and adjustable means in said elements to allow the insertion of said blocks therein in different operative positions relatively to said recess; and means to move said blocks simultaneously into and out of said retaining elements; said blocks being arranged to move radially on said section into engagement with said adjusted means.

5. A tire vulcanizing machine comprising a body member having a tire receiving recess therein, and having a heating chamber in the wall of said recess; a movable mold section arranged to extend into said tire receiving recess; means for bodily movably supporting said mold section on the body member; adjustable means for fastening the mold section in operative position; said fastening means comprising fastening blocks radially movable on said section; fixed retainer elements on the said body member to receive said blocks; withdrawable pins in each retaining member against which the blocks bear in certain operative positions of the mold sections.

6. A tire vulcanizing machine comprising a body member having a tire receiving recess therein, and having a heating chamber in the wall of said recess; a movable mold section arranged to extend into said tire receiving recess; and means for bodily movably supporting said mold section on the body member; adjustable means for fastening the mold section in operative position; said fastening means comprising fastening blocks radially movable on said section; fixed retainer elements on the said body member to receive said blocks; withdrawable pins in each retaining member against which the blocks bear in certain operative positions of the mold sections; and means to move said blocks simultaneously into and out of said retainer elements.

7. A tire vulcanizing machine comprising a body member having a tire receiving recess therein, and having a heating chamber in the wall of said recess; a movable mold section arranged to extend into said tire receiving recess; means for bodily movably supporting said mold section on the body member; adjustable means for fastening the mold section in operative position; said fastening means comprising fastening blocks radially movable on said section; fixed retainer elements on the said body member to receive said blocks; withdrawable pins in each retaining member against which the blocks bear in certain operative positions of the mold sections; and means to move said blocks simultaneously into and out of said retainer elements; and means to move said mold section bodily towards and away from said tire receiving recess.

8. In a vulcanizing machine a body member having a tire curing recess therein, and having means therein to convey heat to the walls of said recess; a movable mold section on said body member adapted to extend into said recess, and having heat conveying means therein; a matrix in said recess comprising a plurality of complemental matrix sections fitting into said recess, each section having arcuate recesses in the inner periphery thereof; sectional mold dies adapted to be fixedly held in said recesses, when the matrix sections are assembled; means for removably securing sections of said matrix in the said recess; and means to removably secure other complemental sections of said matrix to said movable mold section.

9. In a vulcanizing machine a body member having a tire curing recess therein, and having means therein to convey heat to the walls of said recess; a movable mold section on said body member adapted to extend into said recess, and having heat conveying means therein; a matrix in said recess comprising a plurality of complemental matrix sections fitting into said recess, each section having arcuate recesses in the inner periphery thereof; sectional mold dies adapted to be fixedly held in said recesses, when the matrix sections are assembled; means for removably securing sections of said matrix in the said recess; and means to removably secure other complemental sections of said matrix to said movable mold section; said die sections being formed by complemental segments to form a circular mold die.

10. In a vulcanizing machine a body member having a tire curing recess therein, and having means therein to convey heat to the walls of said recess; a movable mold section on said body member adapted to extend into said recess, and having heat conveying means therein; a matrix in said recess comprising a plurality of complemental matrix sections fitting into said recess, each section having arcuate recesses in the inner periphery thereof; sectional mold dies adapted to be fixedly held in said recesses, when the matrix sections are assembled; means for removably securing sections of said matrix in the said recess; and means to removably secure other complemental sections of said matrix to said movable mold section; said matrix sections and die sections being formed by complemental segments to form a circular tire mold.

11. In a vulcanizing machine a body member having a tire curing recess therein, and having means therein to convey heat to the walls of said recess; a movable section on said body member adapted to extend into said recess, and having heat conveying means therein; a matrix in said recess comprising a plurality of complemental matrix sections fitting into said recess, each section having arcuate recesses in the inner periphery thereof; sectional mold dies adapted to be fixedly held in said recesses, when the matrix sections are assembled; means for removably securing sections of said matrix in the said recess; and means to removably secure other complemental sections of said matrix to said movable mold section; said last mentioned means being adapted to engage the matrix sections of the body member to remove the same from the recess as the said mold section is moved out of said recess.

12. A tire vulcanizing machine comprising a body member having a tire receiving recess therein, said body having means in the bottom wall of the recess to selectively heat substantially concentric portions of the wall; a movable mold section telescopingly related to said body member to complement the said tire receiving recess; and means in said movable mold section to selectively heat substantially concentric portions of the said section, the respective concentric heated portions of the said wall and said section being opposite to each other.

13. A tire vulcanizing machine comprising a body member having a tire receiving recess therein, said body having means in the bottom wall of the recess to selectively heat substantially concentric portions of the wall; a movable mold section telescopingly related to said body member to complement the said tire receiving recess; means in said movable mold section to selectively heat substantially concentric portions of the said section, the respective concentric heated portions of the said wall and said section being opposite to each other; and heating means around the outer circumference of the recess to heat the mold thereat.

14. A tire vulcanizing machine comprising a body member having a tire receiving recess therein, said body having means in the bottom wall of the recess to selectively heat substantially concentric portions of the wall; a movable mold section telescopically related to said body member to complement the said tire receiving recess; means in said movable mold section to selectively heat substantially concentric portions of the said section, the respective concentric heated portions of the said wall and said section being opposite to each other; and means of connection between the said body member and the said mold section to allow the axial removal and insertion of said section from and onto said member.

15. In a vulcanizing machine, a pair of annular mold sections adapted to be moved into and out of engagement with each other, said sections being shaped to provide when together, an annular vulcanizing chamber, one section being adapted to telescope in part within the other section, means around the circumference of the second section and the side walls of each section, to convey heat to the said chamber; a matrix in said chamber wherein the tire is molded, said matrix being made of complemental annular sections, one matrix section being connected to one mold section, and the other matrix section being connected to the other mold section to form a continuous annular mold matrix when the sections are together; and means to secure said mold sections to each other.

16. In a vulcanizing machine a pair of annular mold sections adapted to be moved into and out of engagement with each other, said sections being shaped to provide when together an annular vulcanizing chamber, means around the circumference and in the walls of said sections to convey heat to said chamber; a matrix in said chamber wherein the tire is molded, said matrix being formed of a plurality of ringlike members arranged side by side into a pair of complemental matrix sections, one matrix section being connected on one mold section, the other matrix section being connected to the other mold section to form a complete, annular mold matrix when the mold sections are together; and means to secure the mold sections to each other.

17. In a vulcanizing machine, a pair of annular mold sections adapted to be moved into and out of engagement with each other, said sections being shaped to provide when together, an annular vulcanizing chamber, one section being adapted to telescope in part within the other section, means around the circumference of the second section and the side walls of each section, to convey heat to the said chamber; a matrix in said chamber wherein the tire is molded, said matrix being made of complemental annular sections, one matrix section being connected to one mold section, and the other matrix section being connected to the other mold section to form a continuous annular mold matrix when the sections are together; and means to secure said mold sections to each other, said last mentioned securing means being adjustable to accommodate matrices of various width in said chamber.

18. In a vulcanizing machine a pair of annular mold sections adapted to be moved into and out of engagement with each other, said sections being shaped to provide when together an annular vulcanizing chamber, means around the circumference and in the walls of said sections to convey heat to said chamber; a matrix in said chamber wherein the tire is molded, said matrix being formed of a plurality of ringlike members arranged side by side into a pair of complemental matrix sections, one matrix section being connected on one mold section, the other matrix section being connected to the other mold section to form a complete, annular mold matrix when the mold sections are together; and means to secure the mold sections to each other, said last mentioned securing means being adjustable to accommodate matrices of various width in said chamber.

19. In a vulcanizing machine opposed complemental body sections partially telescoped one into the other, each section having a recess therein, the said recesses being arranged to complement each other to form a complete tire receiving recess, at least one of said sections being movable relatively to the other; means to convey heat to said recesses; a matrix in each recess, the matrices being secured to the respective sections to complement each other into a mold wherein the tire is molded.

20. In a vulcanizing machine opposed complemental mold sections partially telescoped one into the other, each having a recess therein, the recesses being arranged to complement each other into a tire receiving cavity, means to convey heat to said recesses; one of said mold sections being movable relatively to the other, a plurality of complemental matrix sections secured to each recess, the matrix sections of one recess being separable from the matrix sections of the other recess when the mold sections are separated, the inner peripheries of said matrix sections being formed into a mold die.

21. In a vulcanizing machine opposed complemental mold sections partially telescoped one into the other, each having a recess therein, the recesses being arranged to complement each other into a tire receiving cavity, means to convey heat to said recesses, one of said mold sections being movable relatively to the other, a plurality of complemental annular matrix sections secured to each recess, the matrix sections of one recess being separable from the matrix sections of the other recess when the mold sections are separated, the inner peripheries of said matrix sections being formed into an annular mold die; and means to detachably secure the mold sections together.

In testimony whereof, I have hereunto set my hand at San Francisco, California, this 3rd day of August 1929.

KARL K. A. THORSEN.

DISCLAIMER 1,876,100.—*Karl K. A. Thorsen*, San Francisco, Calif. TIRE VULCANIZING MACHINE. Patent dated September 6, 1932. Disclaimer filed December 19, 1942, by the assignee, *Mildred E. Bacon*.

Hereby enters this disclaimer to claims 19 and 20 in said specification.

[*Official Gazette January 19, 1943.*]